United States Patent [19]

Crane

[11] Patent Number: 5,068,008

[45] Date of Patent: Nov. 26, 1991

[54] FORMING SECURITY THREAD FOR CURRENCY AND BANK NOTES

[75] Inventor: Timothy T. Crane, Dalton, Mass.

[73] Assignee: Crane & Co., Dalton, Mass.

[21] Appl. No.: 604,456

[22] Filed: Oct. 29, 1990

Related U.S. Application Data

[62] Division of Ser. No. 433,916, Nov. 9, 1989, Pat. No. 4,941,687.

[51] Int. Cl.[5] .......................... B44C 1/22; C23F 1/02; B29C 37/00

[52] U.S. Cl. ................................ 156/659.1; 156/633; 156/634; 156/656; 156/668

[58] Field of Search ............... 156/629, 633, 634, 656, 156/659.1, 661.1, 668; 283/83, 91, 94, 100, 109, 901; 162/103; 427/264

[56] References Cited

U.S. PATENT DOCUMENTS 4,242,378 12/1980 Arai ............................... 156/656 X
4,652,015 3/1987 Crane .................................. 283/91
4,943,093 7/1990 Melling et al. .................. 283/91 X

*Primary Examiner*—William A. Powell

[57] ABSTRACT

A metallized plastic strip containing security indicia is incorporated within currency paper to deter counterfeiting. The plastic strip is made difficult to detect under reflected light by selective pigmentation to match the currency inks. The presence of the security indicia is verified by detection under transmitted light.

3 Claims, 4 Drawing Sheets

FORMING SECURITY THREAD FOR CURRENCY AND BANK NOTES

This is a Divisional, of application Ser. No. 433,916, filed 11/9/89, now U.S. Pat. No. 4,941,687.

BACKGROUND OF THE INVENTION

The advent of high resolution color photocopy equipment simplifies the task of currency replication to the point where it is becoming a crime of opportunity. Whereas such counterfeiting in the past was usually undertaken by skilled artisans perpetrating a deliberate criminal act, it is now becoming a simple process tempting the public to become casual counterfeiters.

U.S. Pat. Nos. 4,652,015 and 4,761,205 both describe techniques whereby a plastic strip containing metal characters is integrally-formed within the currency paper during the papermaking process to provide a "security thread".

The security thread remains virtually undetected under reflected light while being readably discerned with transmitted light which effectively defeats replication by any photocopy process.

When currency paper is printed by the intaglio process, the calendaring effect reduces opacity and thereby the hiding power of the paper fibers. Under careful post print inspection in reflected light, the metal characters appear brighter and lighter than the surrounding paper thus becoming legible.

It is believed that the presence of the light colored characters may be relied upon by the general public to indicate the presence of a security thread without further verification with transmitted light. A counterfeiter could then presumably duplicate the light characters with white toner to give the erroneous impression that a security thread is present.

An early attempt to eliminate the light characters by pigmentation of the plastic substrate strip was not totally successful since the outline of the pigmented plastic strip could be detected upon close scrutiny as a faint continuous line.

U.S. Pat. No. 4,398,994 describes a demetallization process for providing metal characters on a plastic substrate whereby a pigmented coating is selectively applied to the exposed surface of the metal characters. The surface of the metal characters facing the plastic substrate remains reflective. U.S. Pat. No. 4,242,378 teaches a method for coating the plastic substrate under the metal characters with a pigmented coating while leaving the exposed surface of the metal characters uncoated. For security devices fabricated in accordance with the teachings of these Patents the metal characters are discernible from either one surface of the paper or the other depending upon which side of the paper has the bare metal surface outward.

One purpose of the instant invention accordingly, is to provide a security paper containing a metallized security thread that is virtually invisible when viewed under reflected light from both sides of the paper yet is clearly visible from either side of the paper when viewed with transmitted light.

SUMMARY OF THE INVENTION

A security paper employs a plastic strip containing metallized characters incorporated therein as a security thread. A pigmented resin on both sides of the metallized characters prevents detection of the security thread when viewed from both sides of the paper under reflected light. The security thread is readily visible, however, when viewed with transmitted light from either side of the paper.

DESCRIPTION OF THE PREFERRED EMBODIMENT

Figure 1:
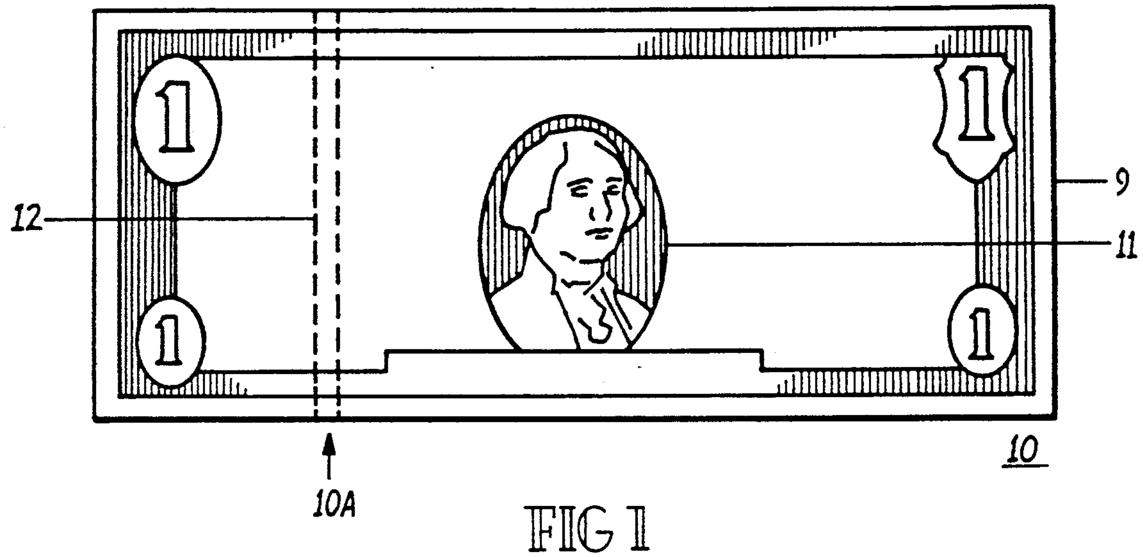
FIG. 1 is a top perspective view of the security paper containing the security thread in accordance with the invention.
Figure 2:
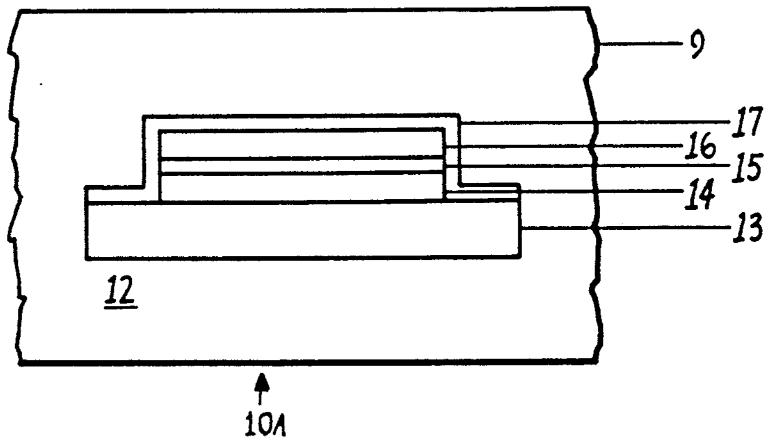
FIG. 2 is an enlarged end view of the part of the security thread of FIG. 1 containing the security thread composite.

A U.S. currency bill 10 of the type described in U.S. Pat. Nos. 4,652,015 and 4,761,205, which Patents are incorporated herein for purposes of reference, is depicted in FIG. 1. The currency bill consists of a security thread 12 incorporated within the currency paper 9 which includes printed indicia as generally indicated at 11 to depict a United States president as well as the bill denomination. The end of the bill 10A containing the security thread 12 is depicted in FIG. 2 to show the cross-sectional placement of the security thread 12 relative to the width in the currency paper. The security thread comprises a polyester film 13 of polyethylene terephthalate which is coated with a pigmented resin 14 that is readily soluble in ethyl alcohol and hereafter referred to as "soluble pigmented resin". The pigment is selected to match the color of the currency paper. The soluble pigmented resin is next coated with a thin continuous film of aluminum metal 15 applied by a vacuum deposition process. For ideal opacity, the aluminum layer should be in excess of 300 angstroms in thickness. Next a layer of pigmented resin 16 that is insoluble in ethyl alcohol, hereafter "insoluble pigmented resin", is printed over the aluminum. The insoluble pigmented resin has the same color and consistency of the soluble pigmented resin and contains the necessary security indicia in the form of printed characters. The plastic strip composite is then subjected to an ethyl alcohol etch, whereby all the material is removed from the plastic strip except where protected by the insoluble pigmented resin. A clear polyester film 17 is next applied over the remaining material by a lamination process to provide durability and environmental protection.

Figure 3:
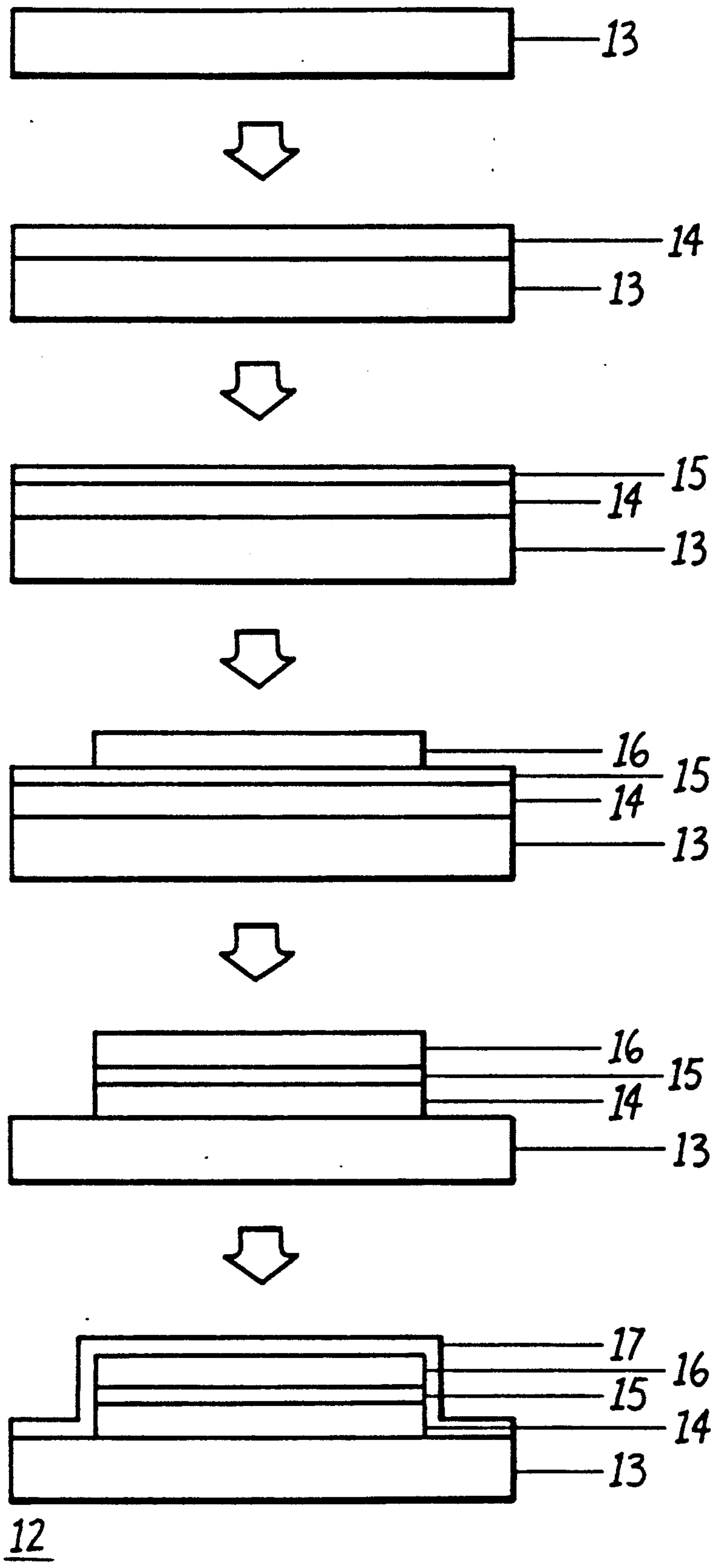
FIG. 3 is a series of end views of the plastic strip within the security thread of FIG. 2 depicting the progression of steps involved in fabricating the security thread.

The processing steps for forming the complete security thread 12 is best seen by referring now to FIG. 3 wherein the polyester film 13 is depicted proceeding through the successive coating and etching procedures. The polyester film is processed from a continuous roll of film, although only the cross-section of the film is depicted in FIG. 3 for purposes of clarity. The soluble pigmented resin 14 is applied to the polyester film by a surface contact coating technique in which one surface of the polyester film is brought in contact with the soluble pigmented resin. When the soluble pigmented resin has completely dried, the aluminum 15 is vacuum deposited on the top surface. The insoluble pigmented resin 16 is next micro-printed onto the surface of the aluminum and the coated film is then subjected to ethyl alcohol to selectively dissolve the soluble pigmented resin 14. The insoluble pigmented resin 16 prevents the ethyl alcohol from contacting the soluble pigmented resin 14 that lies subjacent to the aluminum and insoluble pigmented resin as indicated. Finally, a clear polyester film 17 is applied to the insoluble pigmented resin and exposed plastic strip 13 to protect the finished security thread composite 12 when later subjected to the papermaking processes described in the aforementioned U.S. Patents wherein which the security thread is embedded within the security paper.

Figure 4:
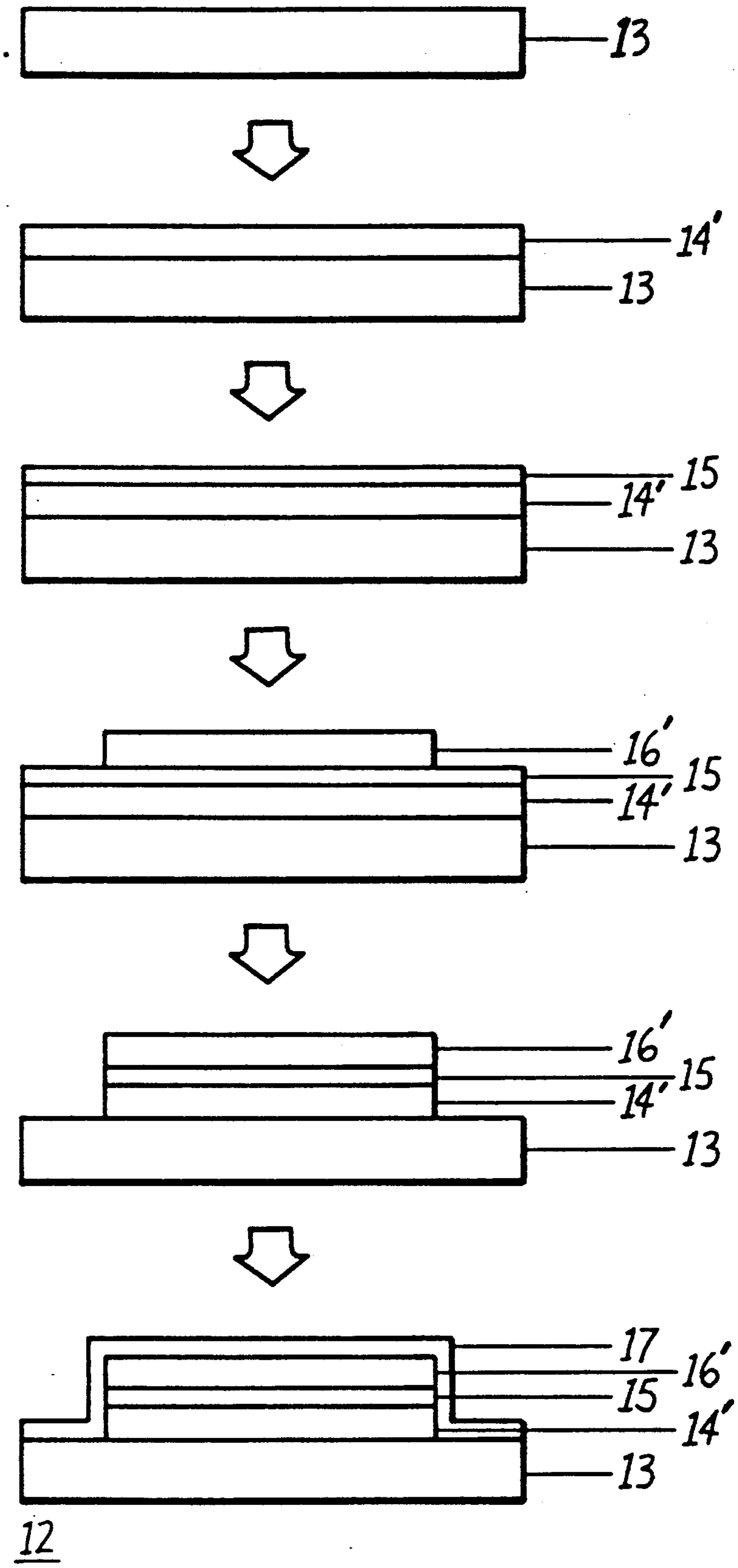
FIG. 4 is a series of end views of the plastic strip within the security thread of FIG. 2 depicting an alternative method of fabricating the security thread.

An alternative method of fabricating the security thread 12 is depicted in FIG. 4 wherein a polyester film 13 is coated with a water-soluble pigmented resin 14'. The aluminum 15 is vacuum deposited over the water soluble pigmented resin and a water-insoluble pigmented resin 16' is micro-printed onto the aluminum. Subjecting the plastic strip and the coated materials to water solution effectively removes all material except where protected by the water-insoluble pigmented resin 16'. A similar water-insoluble polyester film 17 is laminated over the surface of the coated polyester film 13 to form the completed security thread composite 12 which is inserted in the security paper in the same manner described earlier with reference to FIG. 3.

Figure 5:
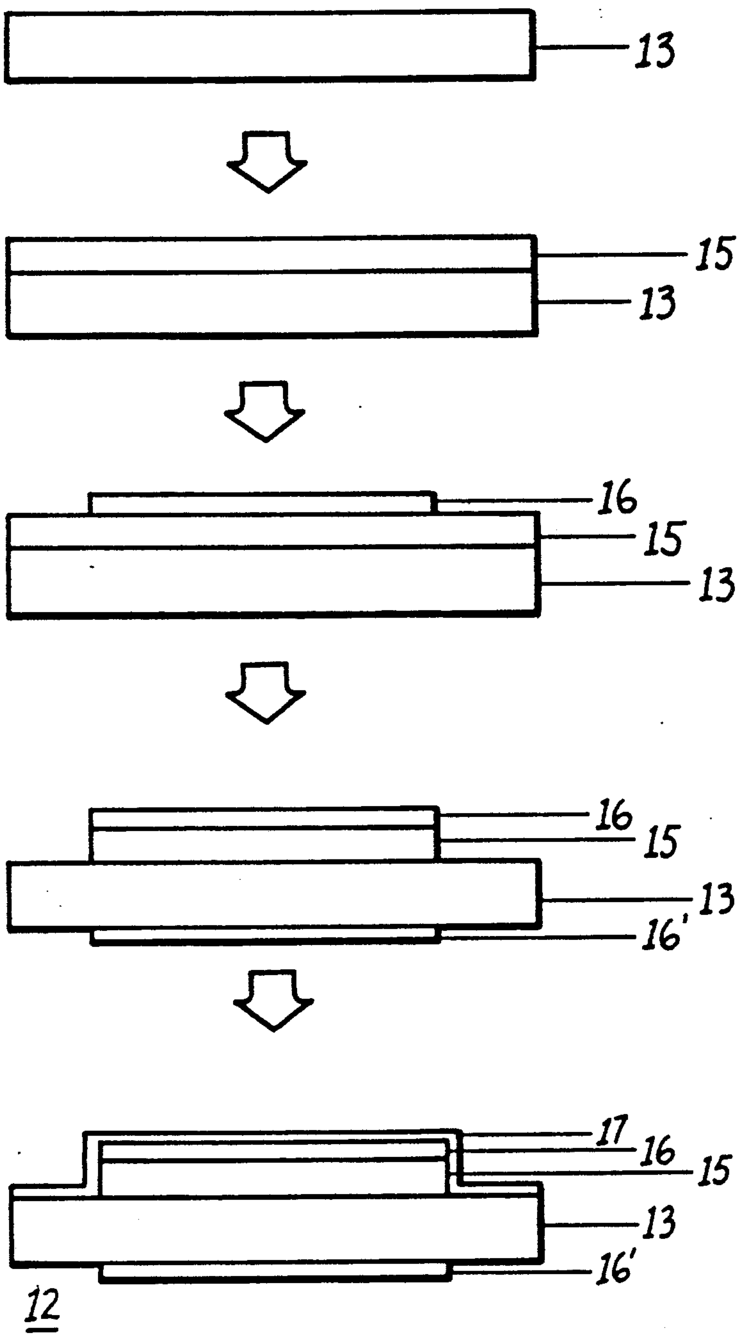
FIG. 5 is a series of end views of the plastic strip within the security thread of FIG. 2 depicting a further method of fabricating the security thread.

It is appreciated that the security thread 12 of the invention can be prepared in a variety of steps as seen by referring now to FIG. 5. A polyester film 13 is first metallized by vacuum deposition of aluminum 15. The insoluble pigmented resin 16 is then printed over the aluminum to provide indicia. The coated plastic film is then subjected to a sodium hydroxide-water solution which effectively dissolves away the aluminum that is not covered by the insoluble pigmented resin. Pigmented resin 16' is then printed on the opposite surface of the polyester film in exact registration with the pigmented resin 16 on the metallized surface 15. Protective polyester film 17 is then applied to the metallized surface of finished security thread 12. This particular process involves less steps than those depicted earlier in FIGS. 3 and 4, however, the positioning of the plastic strip with respect to the micro-printing used to apply the insoluble pigmented resins 16, 16', must be very accurate and precise in order to not distort the final image when viewed under reflected light.

Various methods have herein been described for producing a security thread that when later incorporated within a currency paper is virtually invisible to the unaided eye when viewed from both sides of the paper under reflected light. The security thread becomes readily visible when viewed with transmitted light from either side of the paper to verify the existence thereof.

Having thus described my invention, what I claim as new and desire to seek by Letters Patent is:

1. A method of providing a security thread comprising the steps of:

providing a plastic strip having a metallized surface;

applying solvent-resistant pigmented indicia over said metallized surface;

applying a second pigmented coating on a second surface of said plastic strip opposite said metallized surface; and selectively removing a part of said metallized surface except under said first pigmented indicia to provide said pigmented indicia to said plastic strip.

2. The method of claim 1 wherein said second pigmented coating corresponds to said indicia.

3. The method of claim 1 including the step of enveloping said pigmented indicia in a light transmissive plastic.

* * * * *